United States Patent
Lin

(10) Patent No.: US 6,952,974 B2
(45) Date of Patent: Oct. 11, 2005

(54) SEAT BELT TENSION SENSOR

(75) Inventor: Yingjie Lin, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/460,384

(22) Filed: Jun. 12, 2003

(65) Prior Publication Data

US 2004/0250633 A1 Dec. 16, 2004

(51) Int. Cl.[7] .................... G01L 1/26; G01L 5/04
(52) U.S. Cl. ............................................. 73/862.391
(58) Field of Search ................. 73/862.391, 862.69, 73/862.472, 862.393; 180/268; 280/801.1; 324/207.26

(56) References Cited

U.S. PATENT DOCUMENTS

| | | | |
|---|---|---|---|
| 5,823,627 A | 10/1998 | Viano et al. | |
| 5,960,523 A | 10/1999 | Husby et al. | 24/633 |
| 5,996,421 A * | 12/1999 | Husby | 73/862.451 |
| 6,205,868 B1 * | 3/2001 | Miller | 73/862.391 |
| 6,209,915 B1 * | 4/2001 | Blakesley | 280/801.1 |
| 6,400,145 B1 * | 6/2002 | Chamings et al. | 324/207.26 |
| 6,502,860 B1 | 1/2003 | Siegfried et al. | 280/801.1 |
| 6,520,032 B2 * | 2/2003 | Resh et al. | 73/862.472 |
| 6,554,318 B2 | 4/2003 | Kohut et al. | |
| 6,566,869 B2 * | 5/2003 | Chamings et al. | 324/207.26 |
| 6,605,877 B1 * | 8/2003 | Patterson et al. | 307/10.1 |

FOREIGN PATENT DOCUMENTS

WO  WO02/06092 A1  1/2002

* cited by examiner

*Primary Examiner*—Max Noori
*Assistant Examiner*—Octavia Davis
(74) *Attorney, Agent, or Firm*—Jimmy L. Funke

(57) ABSTRACT

A seat belt tension sensing assembly fixedly secured to a vehicle. The seat belt tension sensing assembly has a housing and a slide slidably received within the housing, the slide being capable of movement between a first position and a second position within the housing, the second position corresponding to a tension in the seat belt consummate with a child safety seat being secured by the seat belt, the slide having a first opening for a portion of the seat belt to pass therethrough. A sensor is operably attached to the slide and is fixedly secured to the housing. The sensor generates a signal indicative of tension on the slide as the seat belt tension increases corresponding to movement of the slide toward the second position. A compliant member providing an urging force on the slide is operably connected to the slide to urge the slide into the first position. The slide and housing interface at the second position preventing further deflection of the compliant member and further loading on the sensor.

20 Claims, 4 Drawing Sheets

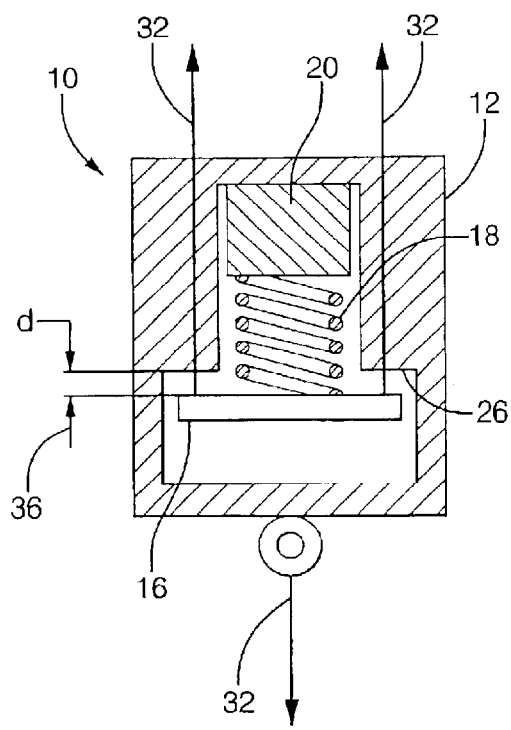
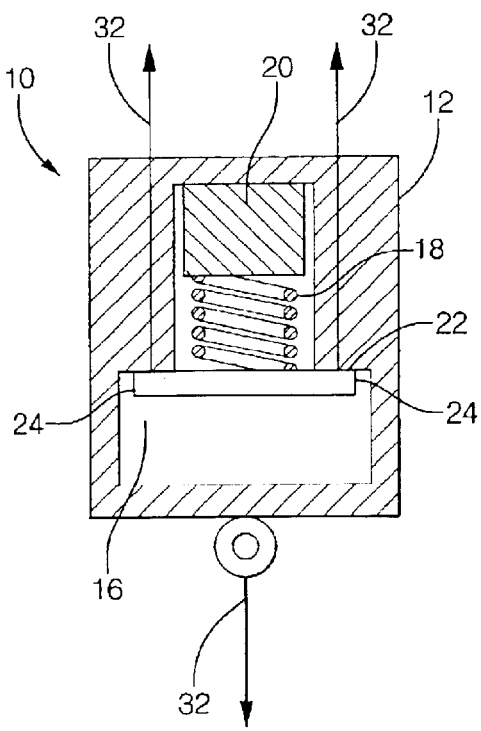
FIG. 1   FIG. 2
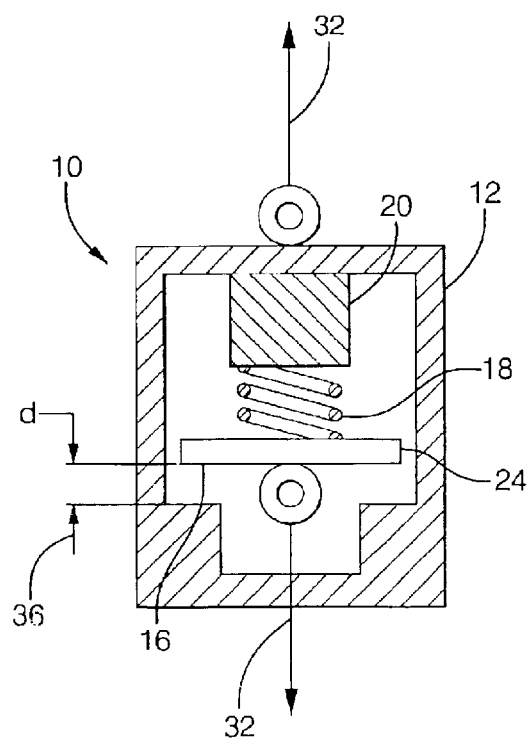
FIG. 3

SEAT BELT TENSION SENSOR

TECHNICAL FIELD

This application relates to tension sensors, and in particular, a seat belt tension sensor.

BACKGROUND

Vehicular airbags play an important role in restraining a seat occupant in vehicular crash situations. However, and in some applications, it may be desirable to suppress the deployment of an air bag. In addition, the deployment of an air bag corresponding to an unoccupied seat represents an unnecessary repair expense.

Vehicles are provided with seat restraint systems such as a seat belt in order to restrain an occupant in a seat of the vehicle. In some vehicles, the seat restraint system may be a lap belt, a shoulder belt, or both. Occasionally, the lap belt and shoulder belt are connected together at one end. The seat restraint system includes a latch plate at the connected end. The seat restraint system also includes a buckle connected at one end by webbing or the like to the vehicle structure. The buckle receives the latch plate to be buckled together. When the buckle and latch plate are buckled together, the seat restraint system restrains movement of the occupant to help protect the occupant during a collision.

Some inflatable restraint systems want input information as to the occupancy of the vehicle seat. Deployment of the inflatable restraint may partially depend on information supplied by sensors in the seat, such as a sensor that would determine the weight of an object in the seat.

When a child seat is placed in the seat and cinched down, the sensors may need a way to distinguish between a large mass and a child seat. Typically, when a child seat is used, there will be high tension in the seat restraint system. Comfort studies have typically shown that a human occupant would not wear their seat restraint that tightly. Readings on seat restraint tension can help to decide the deployment characteristics of the inflatable restraint.

Thus, it may be desirable under certain conditions to provide information to a control module to help to determine the difference between a child seat or an occupant.

Typically, one of two designs are employed to determine seat restraint tension. In one, a compliant design measures the deflection and uses a spring constant to determine the tension. However, this design requires added space for deflection and is impacted by mechanical and electrical/magnetic noises.

The other uses a non-compliant design that directly measures the strain to determine the stress or force information acting on the seat restraint. Typically, a load cell is employed that is more accurate and no observable deflection exists. However, the load cell is required to sustain an overload force (e.g., 18,000N) of about one hundred times a normal operation maximum force (e.g., 180N) without damage to the load cell. In other words, the load cell is required to tolerate a maximum overload force without driving the load cell out off its elastic range. In these load ranges, current load cells only use one percent of the maximum load range which results in low signal levels and poor resolution.

Accordingly, a seat belt tension sensor is desired to generate signal levels that provide better resolution while providing overload protection to prevent damage to the sensor.

SUMMARY OF INVENTION

A method and apparatus for detecting the tension in a seat belt is disclosed. The detected tension corresponds to a tension consummate with a tension created when a child safety seat is secured by the seat belt. The sensor then produces a signal which instructs a controller to suppress the deployment of an air bag. The method and apparatus also disclose use of a compliant member with the sensor and a stop feature configured to prevent further deflection of the compliant member and further loading on the sensor, thereby limiting the sensor to sensing in its elastic range.

The above-described and other features and advantages of the present invention will be appreciated and understood by those skilled in the art from the following detailed description, drawings, and appended claims.

BRIEF DESCRIPTION OF THE DRAWINGS

FIG. 1 is a schematic illustration of a seat belt tension sensor assembly having a compressible compliant member without tension applied thereto;

FIG. 2 is a schematic illustration of the seat belt tension sensor assembly of FIG. 1 showing the compliant member with tension applied;

FIG. 3 is a schematic illustration of another embodiment of a seat belt tension sensor having an extendable compliant member without tension applied thereto;

DETAILED DESCRIPTION OF THE PREFERRED EMBODIMENTS

Figure 4:
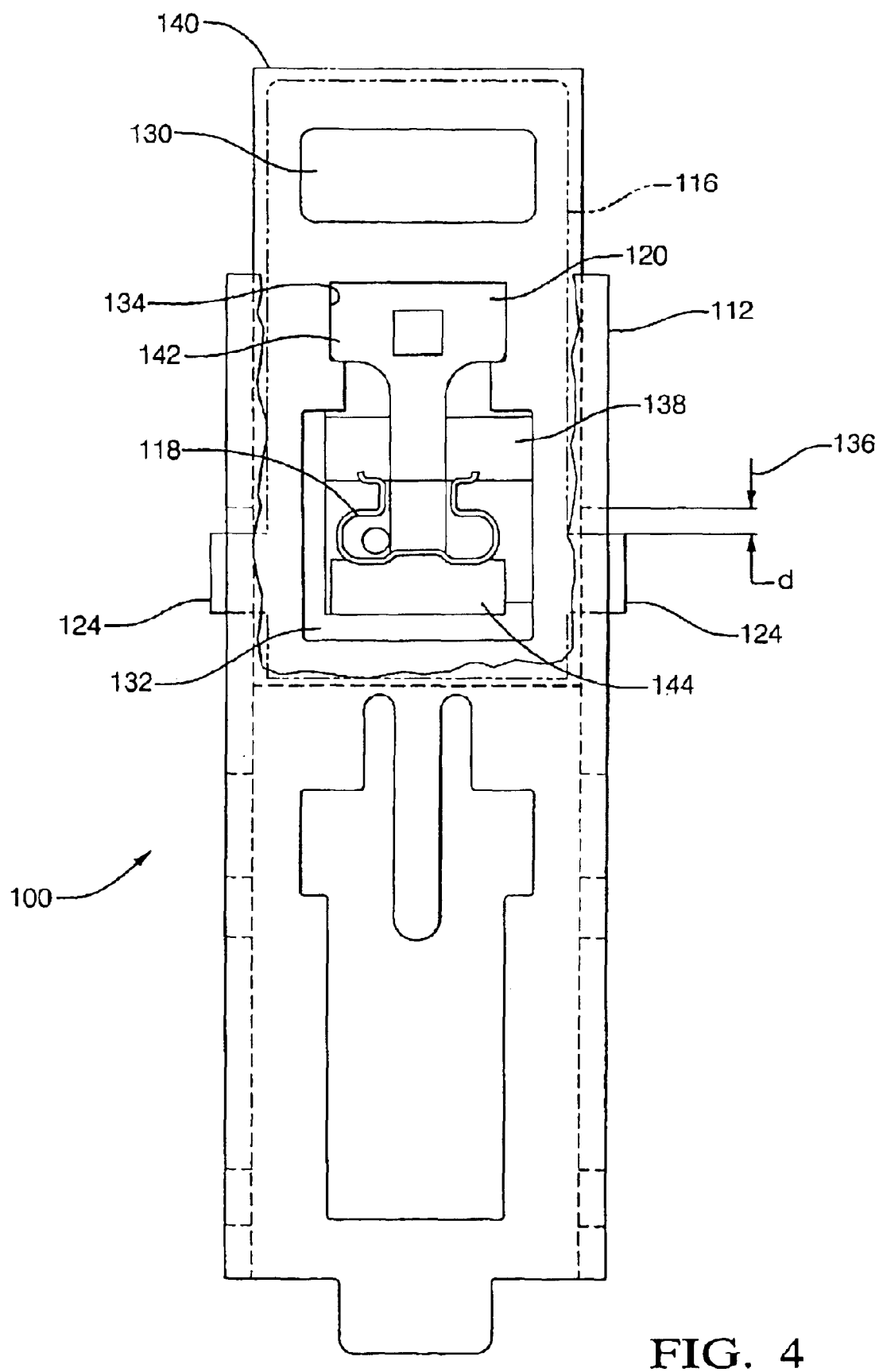
FIG. 4 is a top view of an exemplary embodiment of a seat belt tension sensor assembly illustrated in FIGS. 1 and 2 without any tension.

Referring now to FIGS. 1 and 2, one embodiment of a seat belt tension sensor assembly is schematically and simply shown generally at 10. Sensor assembly 10 includes a frame or housing 12 operably fastened between seat belt components. For example, housing 12 can be slidably attached on one end to a seat belt buckle and on the other end to a vehicle seat or floor (not shown). The buckle typically is the receiving end of the seat belt. The belt webbing is extended and a metal end (not shown) clicks into the buckle. The buckle is attached to a moveable slide 16 operably attached within housing 12. Slide 16 in turn, is operably connected to a compliant member 18 that is serially connected to a load cell 20. Load cell 20 is operably connected to housing 12. Slide 16 and housing 12 are configured having a compliant stop feature 22 therebetween when in contact to absorb any overload after a full range of compliancy is reached between load cell 20 and compliant member 18 (See FIG. 2). More specifically, compliant stop feature 22 is configured to absorb any overload after a limit of compliancy of compliant member 18 is reached and before a maximum overload force is experienced by load cell 20 where any overload force should not drive load cell 20 out off its elastic range. In the embodiments depicted in FIGS. 1–3, compliant stop feature 22 is configured in housing 12 to cooperate with outboard ends 24 of slide 16. Compliant stop feature 22 is a contact interface between outboard ends 24 of slide 16 and a shoulder 26 of housing 12 to absorb any further increase in tension after such abutment between slide outboards ends 24 and shoulder 26 occurs. In this manner, load cell 20 is insulated from being impacted by any further increase in load thereby protecting against an overload force that exceeds an elastic range of load cell 20.

Still referring to FIGS. 1–3, compliant member 18 is disposed between load cell 20 and slide 16 and is configured to urge slide 16 from abutment with shoulder 26. Compliant member 18 urges slide 16 to a first position when a force in a direction indicated generally with arrows 32 is about zero or minimal. As the force 32 increases due to tensioning of the seat belt, slide 16 is biased against the urging force of compliant member 18. Since the load cell 20 is configured to measure true strain, the deflection of compliant member 18 does not impact on the measurement of tension via the strain indicated by load cell 20. Furthermore, since compliant member 18 does not impact the ability of load cell 20 to measure the strain as a result of force 32, tolerance dimensions for compliant member are loose, thus providing a low cost component for sensor assembly 10.

As force 32 increases to an amount sufficient to deflect compliant member 18 a distance 36 representative of a distance "d" between shoulder 26 and outboard ends 24 of slide 16 when slide 16 in the first position, slide 16 abuts housing 12 in a second position. When housing 12 abuts slide 16 at this second position, the stop feature 22 is called into action providing a compliant limitation force to counter increased forces 32 while insulating load cell 20 from further strain and further deflection of compliant member 18 at this second position. As long as the stop feature 22 is not damaged by the overload, the load cell is safe assuming the compliant limitation force is less than the load cell elastic range.

In exemplary embodiments as illustrated in FIGS. 1–3, compliant member 18 is a spring, for example, allowed to deflect a total distance "d" from the first position to the second position. It will be recognized by one skilled in the art that the sensor assembly may be configured having compliant member 18 or spring in compression (i.e., FIGS. 1 and 2) or in tension (i.e., FIG. 3). In a preferred embodiment, compliant member 18 is configured as a compression compliant member 18 as in FIGS. 1 and 2.

Figure 5:
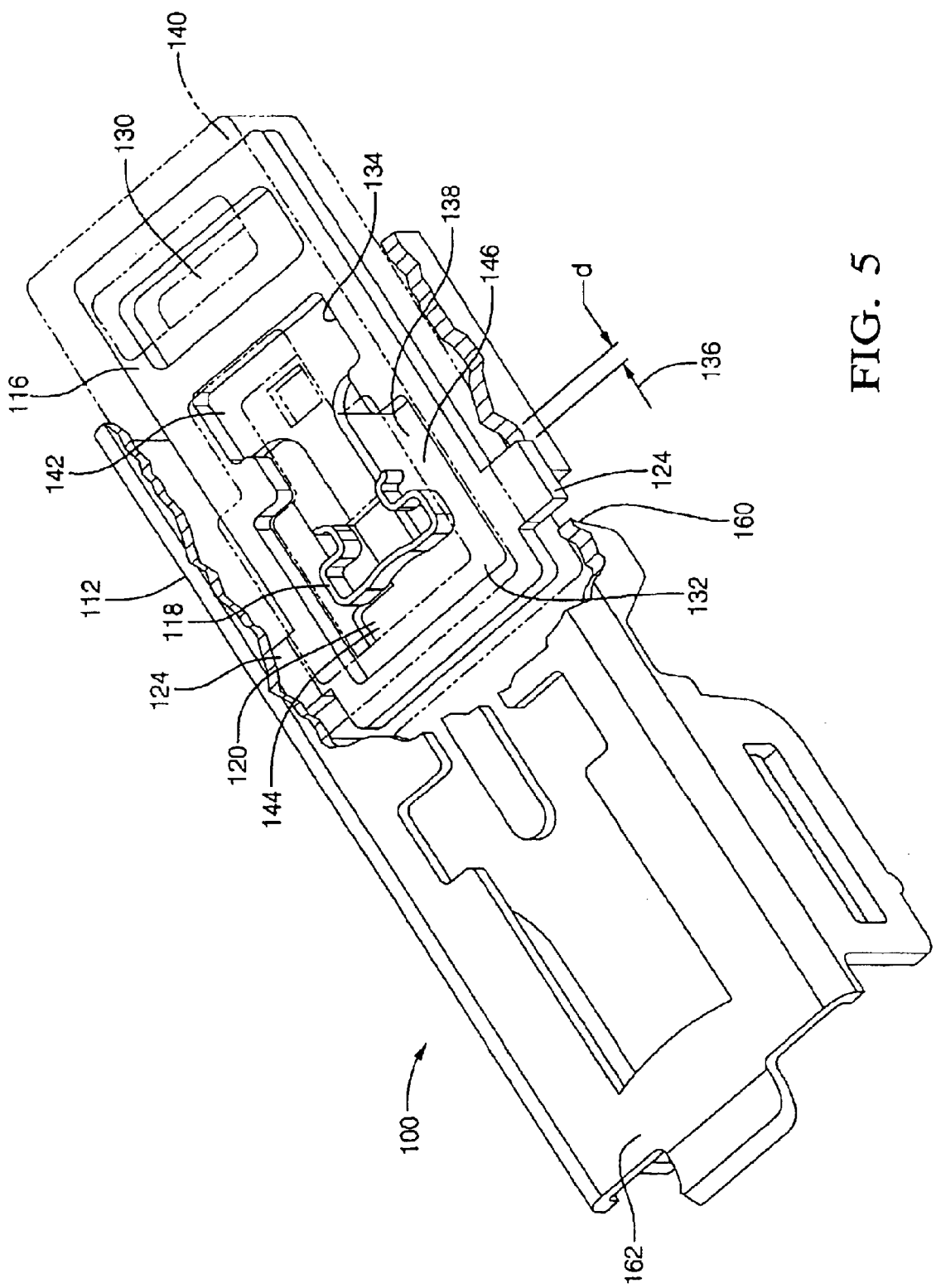
FIG. 5 is a perspective view of the seat belt tension sensor assembly of FIG. 4.

Referring now to FIGS. 4 and 5, an exemplary embodiment of a sensor assembly 100 is illustrated having a compliant member 118 in a compression configuration similar to that depicted in FIGS. 1 and 2. More specifically, sensor assembly 100 includes a housing 112 configured to slidably receive a slide 116 therein. Slide 116 includes tabs or outboard ends 124 extending therefrom at one end thereof and includes a first opening 130 at an opposite end. Opening 130 is configured to receive seat belt webbing therethrough. Slide 116 further includes a cavity 132 configured to receive a load cell or sensor element 120 therein. Cavity 132 is further configured to retain one end of sensor element 120 proximate opening 130 in a second opening 134. One end portion of sensor element 120 is complementary configured with second opening 134 to be fixedly secured therein.

An opposite end of sensor element 120 is biased away from opening 130 via a compliant member 118 disposed within cavity 132. Compliant member 118 is preferably a compression spring configured, and positioned to urge sensor element 120 away from opening 130 to counter any tensioning force applied at opening 130 applied via seat belt webbing extending therethrough.

Figure 6:
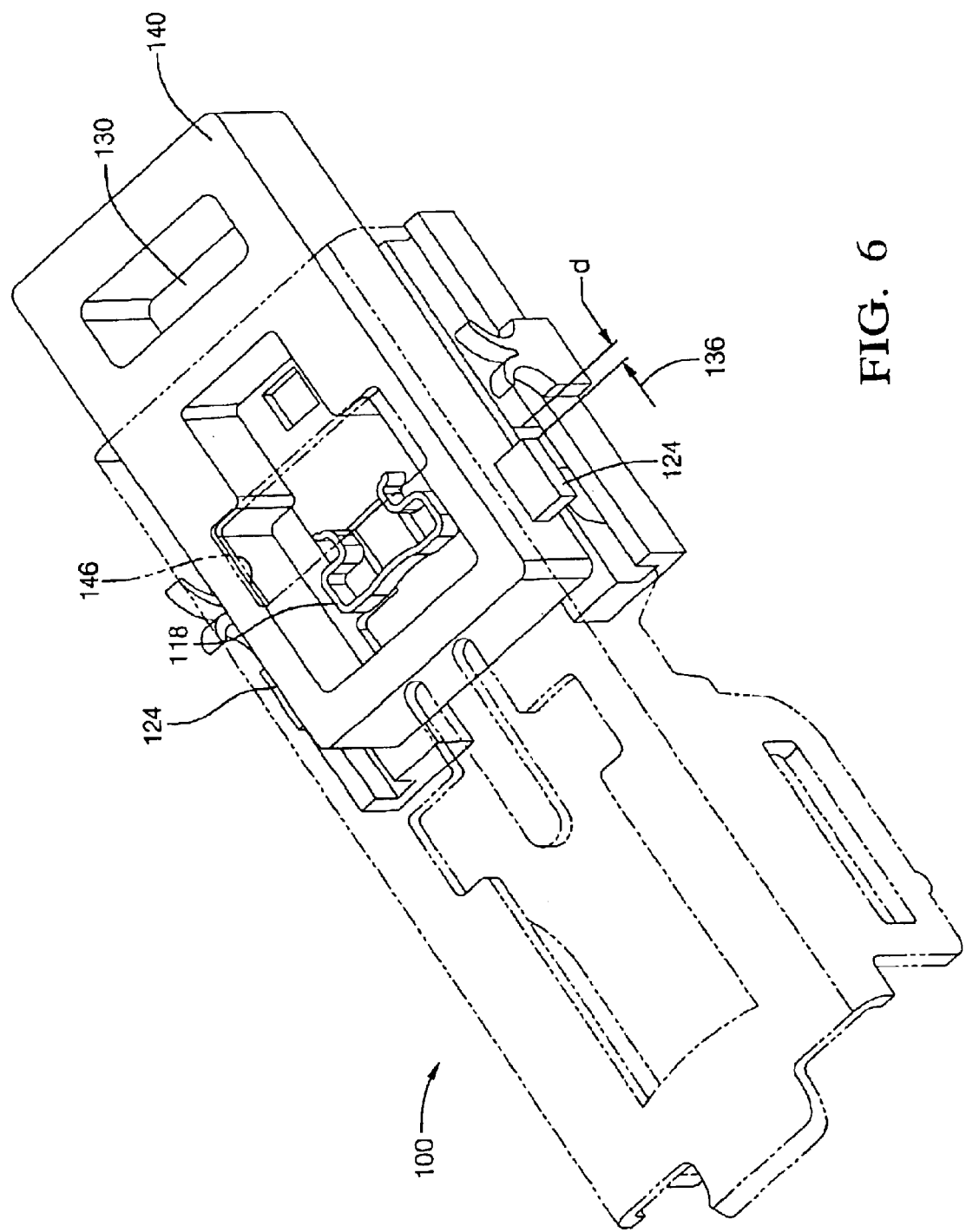
FIG. 6 is a perspective view of the seat belt tension sensor assembly of FIG. 5 showing a slide and sensing element overmolded with a protective material.

In the embodiment illustrated in FIGS. 4–6, sensor element 120 is preferably a strain gauge device configured as an "I-beam" as illustrated, wherein one end defining the "I" is fixedly secured in second opening 134 and an opposite end defining the "I" is biased away from opening 130 via spring 118. An intermediate portion defining the "I" of the strain gauge device is in the form of known electrical resistance wire strain gauges. The wire strain gauges are preferably wired in a Wheatstone bridge circuit, in a known manner, in order to cancel out the effects of temperature on the wire strain gauges. However, any strain gauge is contemplated for use therewith.

The strain gauge device is partially covered with a protective insulative material 140 (best seen in FIG. 6), such as plastic or polyurethane, in order to isolate and protect the gauge from environmental conditions. Protective material 140 is configured to expose opening 130 in slide 116. The sensor 120 includes leads (not shown) that protrude from the protective material 140 and are operably connected to a printed circuit board (PCB) 138. In the embodiment illustrated in FIGS. 4–6, the sensor 120 is preferably wired in a Wheatstone bridge circuit. Two of the leads are used to apply a voltage across the bridge, and the other two leads are used to measure voltage potential across the bridge indicative of the amount of strain sensed by the strain gauge.

When a force is applied to a first portion 142 of the sensor element 120 that is fixed relative to slide 116, such as by tensioning seat belt webbing through opening 130, the force causes a second portion 144 of the sensor element 120 to move relative to the first portion 142 defined by an opposite end of sensor element 120. This is because the first portion 142 is fixedly connected to the slide 116 while second portion is not. The sensor element 120 is oriented such that the force causes the second portions 144 to move relative to the first portion. Furthermore, it will be recognized with reference to FIG. 5, that housing 112 provides a wall 146 transversely disposed in cavity 132 for one end of spring 118 to be fixed therewith while an opposite end of spring 118 is configured to rest against and bias second portion 140 in a direction away from opening 130.

If the force acts to move the first and second portions 142 and 144 away from each other, the distance of a gap 136 decreases a given distance depending upon the magnitude of the force applied to the sensor element 120 and the compliancy of compliant member 118. If the magnitude of the force is large enough, outboard ends 124 extending through overmolded protection material 140 traverse from the first position a distance "d" 136 to a second position where a first edge defining each outboard end 124 abuts housing 112 at a respective second edge thereof. When first and second edges move into abutting engagement with each other at the second position, the sensor element no longer is affected by any further increase in tension force applied. Thus, sensor element 120 is protected from an overload force that exceeds an elastic range of sensor element 120 as long as the stop feature, provided by abutting engagement between first and second edges defining a distance "d" 136 therebetween is not damaged by any overload.

In an exemplary embodiment, abutting engagement between first and second edges is configured to provide a compliant limitation force against further increase in tensile force applied after compliant member 118 deflects a distance "d" 136. Until the compliant member 118 deflection reaches the compliant limitation defined by deflection distance "d" 136, sensor element 120 and compliant member 118 see all tensile forces acting thereon. After compliant member 118 reaches the compliant limitation defined by a maximum deflection distance "d" 136 at the second position, sensor element 120 and compliant element 118 will not see any load increase as they are insulated by the compliant stop feature of abutting engagement between first and second edges.

In operation, as the second portion 144 moves relative to the fixed first portion 142, the sensor element 120 is stretched. The distance that the sensor element 120 is stretched is extremely small, and may be as little as a few millionths of an inch or less. As the sensor element 120 is stretched, the electrical resistance of the strain gauge changes in proportion to the stretch distance.

The change in resistance of the strain gauge results in a change in voltage potential measured across the bridge circuit. The change in resistance, being proportional to the change in the stretch distance by the force applied to the strain gauge, is also proportional to the amount of tension on the slide 116 via opening 130 acting to move the second portion 144 relative to the first portion 142. Thus, the change in voltage potential measured across the bridge can be used to calculate the amount of tension on the slide 116. The tension may be calculated by known means, such as a microcomputer, and used for a desired purpose, such as for providing data to a controller.

In the above-disclosed configurations, a load cell and a compliant member, such as a spring, are employed instead of the load cell alone as in the prior art. Because the load cell measures true strain, deflection of the compliant member does not impact the strain measurement and allows loose dimension tolerances of the compliant member, thus resulting in lower component costs.

The above principle schematically depicted in two different embodiments shown in FIGS. 1 and 3 disclose that before compliant member 18 reaches a compliant limitation deflection, load cell 20 and compliant member 18 realize substantially a full range of the force acting upon them. After compliant member 18 reaches its limit of deflection, load cell 20 and compliant member 18 do not realize further load increase, as all further loads are realized by a stop feature 22 between an edge configured in housing 12 and outboard ends 24 defining slide 16. As long as stop feature 22 and outboard ends 24 of slide 16 are not damaged by the overload, load cell 20 is prevented from exceeding its elastic range if the compliant limitation force exerted between stop feature 22 and slide 16 exceeds the load cell 20 elastic range.

The dimensions of slide 16 are such that the same is capable of movement in a range defined by a first position (FIG. 1) and a second position (FIG. 2). The first position corresponds to little or no tension, and the second position corresponds to a tension greater than or equal to a pre-determined tension. The pre-determined tension relates to a tension value that will determine whether or not a child seat is cinched by the seat belt.

In an exemplary embodiment depicted in FIGS. 4–6 slide 116 has a pair of tab portions 124 defining outboard ends of slide 116 which protrude outwardly from the surface of slide 116 proximate and engage with a rail 160 extending from a base 162 defining housing 112 (FIG. 6). It will be noted and recognized by one skilled in the pertinent art that at least one tab or more defining a corresponding outboard end 124 may be employed with a respective rail 160 to provide a stop at the second position to prevent further loading on the tension sensor.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A seat belt tension sensing assembly fixedly secured to a vehicle, comprising:
   a housing;
   a slide slidably received within said housing, said slide being capable of movement between a first position and a second position within said housing, said slide having a first opening for a portion of said seat belt to pass therethrough;
   a sensor, a first end of which is fixedly secured in said slide, said sensor generating a signal indicative of tension on said slide as said seat belt tension increases corresponding to movement of said slide toward said second position; and
   a compliant member providing an urging force on a second end of said sensor, said urging force thereby urging said sensor and said slide into said first position;
   wherein said slide and said housing interface at said second position preventing further deflection of said compliant member and further loading on said sensor.

2. The assembly of claim 1, wherein said interface between said slide and said housing is a stop feature therebetween, said stop feature is configured to prevent said sensor from exceeding its elastic range when an overload force is exerted between said housing and said slide that exceeds the elastic range of said sensor.

3. The assembly of claim 1, wherein said interface between said slide and said housing is a compliant stop feature therebetween, said compliant stop feature having a compliancy between said slide and said housing when an overload force is exerted between said housing and said slide that exceeds the elastic range of said sensor.

4. The assembly of claim 1, wherein said slide is configured with at least one of a tab extending therefrom defining a corresponding outboard end of said slide engageable with a corresponding rail extending from said housing to provide a stop at said second position.

5. The assembly of claim 1, wherein said sensor is a strain gauge.

6. The assembly of claim 5, wherein one end of said strain gauge is fixedly disposed within a second opening of said slide proximate said first opening.

7. The assembly of claim 6, wherein said compliant member is disposed at an opposite end of said strain gauge.

8. The assembly of claim 7, wherein said compliant member provides one of a tension and compression force on said slide.

9. The assembly of claim 1, wherein said compliant member is a spring.

10. The assembly of claim 9, wherein said spring is operably connected to said slide and said sensor, said spring provides one of a tension and a compression force relative to movement of said slide from said first position to said second position.

11. The assembly of claim 1, wherein said signal is input to a controller configured to suppress a vehicle safety device if said signal meets or exceeds a threshold value.

12. The assembly of claim 11, wherein said vehicle safety device is a passenger airbag.

13. The assembly of claim 12, wherein said passenger airbag is suppressed when said signal is indicative of a child seat retrained by a corresponding seat belt webbing.

14. The seat belt tension assembly as in claim 1, wherein said sensor provides a discrete signal.

15. The seat belt tension assembly as in claim 1, wherein said sensor provides a linear signal.

16. A method for limiting damage to a seat belt tension sensor when an overload force is applied, the method comprising:

receiving a slide within a housing, said slide being capable of movement between a first position and a second position within said housing, said slide having a first opening for a portion of said seat belt to pass therethrough;

attaching a first end of a sensor to said slide, a second end of said sensor being fixedly secured to compliant member;

generating a signal indicative of tension on said slide as said seat belt tension increases corresponding to movement of said slide toward said second position; and providing said compliant member between said housing and said sensor, said compliant member configured to urge said slide into said first position;

wherein said slide and said housing interface at said second position preventing further deflection of said compliant member and further loading on said sensor.

17. The method of claim 16, wherein said interface between said slide and said housing is a stop feature therebetween, said stop feature is configured to prevent said sensor from exceeding its elastic range when an overload force is exerted between said housing and said slide that exceeds the elastic range of said sensor.

18. The method of claim 16 wherein said interface between said slide and said housing is a compliant stop feature therebetween, said compliant stop feature having a compliancy between said slide and said housing when an overload force is exerted between said housing and said slide that exceeds the elastic range of said sensor.

19. The method of claim 16 further comprising:

configuring said slide with at least one of a tab extending therefrom defining a corresponding outboard end of said slide engageable with a corresponding rail extending from said housing to provide a stop at said second position, said stop configured to limit said sensor to sensing in its elastic range.

20. The method of claim 16, wherein said sensor is a strain gauge.

* * * * *